(12) United States Patent
Park et al.

(10) Patent No.: US 8,932,481 B2
(45) Date of Patent: Jan. 13, 2015

(54) CATHODE ACTIVE MATERIAL, METHOD OF PREPARING THE SAME, AND CATHODE AND LITHIUM BATTERY INCLUDING THE CATHODE ACTIVE MATERIAL

(75) Inventors: Kyu-sung Park, Suwon-si (KR); Young-min Choi, Suwon-si (KR)

(73) Assignee: Samsung SDI Co., Ltd., Yongin-si, Gyeonggi-do (KR)

( * ) Notice: Subject to any disclaimer, the term of this patent is extended or adjusted under 35 U.S.C. 154(b) by 22 days.

(21) Appl. No.: 13/137,612

(22) Filed: Aug. 30, 2011

(65) Prior Publication Data

US 2012/0049126 A1 Mar. 1, 2012

(30) Foreign Application Priority Data

Aug. 31, 2010 (KR) .................. 10-2010-0084897
Jul. 11, 2011 (KR) .................. 10-2011-0068549

(51) Int. Cl.
| | | |
|---|---|---|
| H01M 4/88 | (2006.01) | |
| H01M 4/58 | (2010.01) | |
| C04B 35/447 | (2006.01) | |
| H01B 1/06 | (2006.01) | |
| H01B 1/24 | (2006.01) | |
| H01M 10/052 | (2010.01) | |
| H01M 4/136 | (2010.01) | |

(52) U.S. Cl.
CPC .......... *H01M 4/5825* (2013.01); *H01M 10/052* (2013.01); *C04B 2235/3272* (2013.01); *C04B 2235/3279* (2013.01); *C04B 2235/3262* (2013.01); *C04B 35/447* (2013.01); *C04B 2235/3203* (2013.01); *C04B 2235/76* (2013.01); *C04B 2235/3275* (2013.01); *H01M 4/136* (2013.01); *Y10S 977/742* (2013.01); *Y10S 977/948* (2013.01)
USPC ..................... 252/182.1; 252/506; 252/519.1; 429/231.95; 977/742; 977/948

(58) Field of Classification Search
USPC ............... 252/182.1, 519.1, 506; 429/231.95; 977/742, 773, 948
See application file for complete search history.

(56) References Cited

U.S. PATENT DOCUMENTS

| | | | |
|---|---|---|---|
| 2006/0263286 A1 | 11/2006 | Wu et al. | |
| 2010/0171071 A1* | 7/2010 | Jin et al. ..................... | 252/182.1 |
| 2013/0071753 A1* | 3/2013 | Kim et al. ................ | 429/231.95 |

FOREIGN PATENT DOCUMENTS

| | | | |
|---|---|---|---|
| CN | 001691380 | 11/2005 | |
| CN | 101540398 | 9/2009 | |
| EP | 2207229 A1 | 7/2010 | |
| JP | 1997-171827 | 6/1997 | |
| JP | 2005-353320 | * 12/2005 | ............ H01M 4/58 |
| JP | 2009-029670 | 2/2009 | |
| JP | 2009-206085 | 9/2009 | |
| KR | 10-2003-0049924 A | 6/2003 | |
| KR | 10-2004-0098165 A | 11/2004 | |
| KR | 10-2009-0008870 A | 1/2009 | |
| KR | 10-2009-0104117 A | 10/2009 | |

(Continued)

OTHER PUBLICATIONS

European Search Report dated Dec. 15, 2011.

*Primary Examiner* — Bijan Ahvazi
(74) *Attorney, Agent, or Firm* — Lee & Morse, P.C.

(57) ABSTRACT

A cathode active material includes a core including a material having an olivine structure, and a nitrogen atom doped into at least a portion of the core.

13 Claims, 6 Drawing Sheets

(56) References Cited

FOREIGN PATENT DOCUMENTS

| | | |
|---|---|---|
| KR | 10-2009-0106841 A | 10/2009 |
| KR | 10-2010-0004797 A | 1/2010 |
| KR | 10-2010-0044714 A | 4/2010 |
| WO | WO-2006-066470 | 6/2006 |
| WO | WO 2008/091707 A2 * | 7/2008 |
| WO | WO-2010-041598 | 4/2010 |

* cited by examiner

CATHODE ACTIVE MATERIAL, METHOD OF PREPARING THE SAME, AND CATHODE AND LITHIUM BATTERY INCLUDING THE CATHODE ACTIVE MATERIAL

BACKGROUND

1. Field

The present disclosure relates to cathode active materials, methods of preparing the same, and cathodes and lithium batteries including the cathode active materials.

2. Description of the Related Art

For use in various small and high-performing devices, it is desirable that lithium batteries have a high energy density, in addition to small-volume and light-weight characteristics. In addition, for use in electric vehicles, cyclic characteristics of a lithium battery at room temperature and at high temperatures may be regarded as important factors.

To realize a lithium battery satisfying the characteristics described above, various cathode active materials are being reviewed.

SUMMARY

According to an embodiment, there is provided a cathode active material including a core including a material having an olivine structure and a nitrogen atom doped into at least a portion of the core.

A nitrogen atom doping region of the core may have a crystalline phase.

The core may include a metal having an oxidation number of +2. An amount of a metal having an oxidation number of +3 present in the core may be 5 wt % or less based on a total amount of the metal having an oxidation number of +2 and the metal having an oxidation number of +3 present in the core.

The core may include nitrogen and oxygen. The core may have a nitrogen peak corresponding to a binding energy of about 398 to about 400 eV and an oxygen peak corresponding to a binding energy of about 530 to about 534 eV in an X-ray photoelectron spectrum. A composition ratio of nitrogen to oxygen measured based on areas of the respective peaks may be equal to or greater than 1:100.

The composition ratio of nitrogen to oxygen may be in a range of 1:100 to 20:100.

The core may include nitrogen and phosphorus. The core may have a nitrogen peak corresponding to a binding energy of about 398 to about 400 and a phosphorus peak corresponding to a binding energy of about 132 to about 136 eV in an X-ray photoelectron spectrum. A composition ratio of nitrogen to phosphorus measured based on areas of the respective peaks may be equal to or greater than 1:100.

A composition ratio of the nitrogen to the phosphorus may be from 1:100 to 30:100.

The core may have a nitrogen peak corresponding to a binding energy of about 396 to about 398 eV in an X-ray photoelectron spectrum.

An average particle diameter of the core may be in a range of about 1 nm to about 1000 μm.

The material having an olivine structure may be represented by Formula 1 below:

<Formula 1> wherein $0.9 \leq x \leq 1.1$, $0 < y \leq 1$, $0 \leq z \leq 1$, $1.9 \leq x+y+z \leq 2.1$, and $0 \leq d \leq 0.2$;
Me represents at least one of iron (Fe), manganese (Mn), nickel (Ni), and cobalt (Co);

M represents at least one of magnesium (Mg), calcium (Ca), strontium (Sr), barium (Ba), titanium (Ti), zirconium (Zr), niobium (Nb), molybdenum (Mo), tungsten (W), zinc (Zn), aluminum (Al), and silicon (Si); and
X represents at least one of sulfur (S) and fluorine (F).

The material having an olivine structure may include at least one compound selected from $LiFePO_4$, $LiFe_{1-a}Mn_aPO_4$ (where $0<a<1$), and $LiMnPO_4$.

The cathode active material may further include a coating layer including conductive carbon formed on the core According to an embodiment, there is provided a method of preparing a cathode active material, the method including contacting a material having an olivine structure and a nitrogen precursor gas.

In the contacting, nitrogen may be doped into at least a portion of the material having an olivine structure.

The nitrogen precursor gas may include ammonia.

The material having an olivine structure may be represented by Formula 1 below:

<Formula 1> wherein $0.9 \leq x \leq 1.1$, $0 < y \leq 1$, $0 \leq z \leq 1$, $1.9 \leq x+y+z \leq 2.1$, and $0 \leq d \leq 0.2$;
Me represents at least one of iron (Fe), manganese (Mn), nickel (Ni), and cobalt (Co);
M represents at least one of magnesium (Mg), calcium (Ca), strontium (Sr), barium (Ba), titanium (Ti), zirconium (Zr), niobium (Nb), molybdenum (Mo), tungsten (W), zinc (Zn), aluminum (Al), and silicon (Si); and
X represents at least one of sulfur (S) and fluorine (F).

The material having an olivine structure may include at least one of $LiFePO_4$, $LiFe_{1-a}Mn_aPO_4$ (where $0<a<1$), and $LiMnPO_4$.

The contacting may be performed at a temperature of about 100 to about 800° C.

The contacting may be continuously performed for about 1 minute to about 600 minutes.

The material having an olivine structure may include a coating layer including conductive carbon formed on the material having an olivine structure.

According to an embodiment, a cathode may include the cathode active material.

According to an embodiment, a lithium battery may include the cathode.

BRIEF DESCRIPTION OF THE DRAWINGS

The above and other features will become more apparent to those of ordinary skill in the art by describing in detail exemplary embodiments with reference to the attached drawings, in which.

DETAILED DESCRIPTION

The present application claims the benefits of priority to Korean Patent Application No. 10-2010-0084897, filed on Aug. 31, 2010, and Korean Patent Application No. 10-2011-0068549, filed on Jul. 11, 2011, in the Korean Intellectual Property Office, the disclosures of which are incorporated herein by reference in their entireties.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey the scope of the invention to those skilled in the art.

Hereinafter, cathode active materials, methods of preparing the cathode active materials, and cathodes and lithium batteries including the cathode active materials according to exemplary embodiments will be described in detail.

A cathode active material according to an embodiment includes a core including a material having an olivine structure, and a nitrogen atom doped into at least a portion of the core.

Due to the doping of a nitrogen atom into the at least a portion of the core, the cathode active material may have improved conductivity. A lithium battery including the cathode active material may have improved high-rate characteristics.

For example, the doping with the nitrogen atom may be performed by contacting the material having an olivine structure and a nitrogen precursor gas at high temperature for a predetermined period of time. In the contacting of the material having an olivine structure and the nitrogen precursor gas, a nitrogen atom derived from the nitrogen precursor gas may be doped into a predetermined doping depth inside the core by diffusion.

When a portion of the core of the cathode active material is doped with a nitrogen atom, a concentration of the nitrogen atom doped into the core may have a concentration gradation that decreases in a direction from a surface to a center of the core. That is, the farther from the center of the core of the cathode active material, the higher the concentration of the doped nitrogen atom. On the other hand, the closer the center of the core, the lower the concentration of the doped nitrogen atom.

Figure 1:
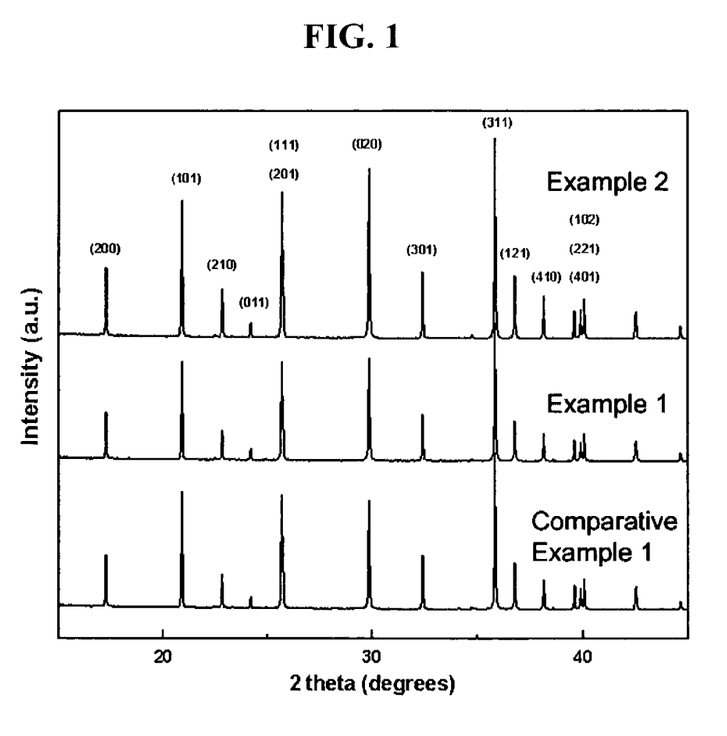
FIG. 1 illustrates X-ray diffraction test results of cathode active materials prepared according to Examples 1 and 2 and Comparative Example 1.

In the core, a nitrogen atom doping region may be present in a crystalline phase. The nitrogen atom doping region may not form a separate secondary phase and may be present in the same crystalline phase as the material having an olivine structure inside the core. In the core, both a region doped with nitrogen atoms and a region not doped with nitrogen atoms may be present in an identical single phase. The separate secondary phase may be absent in, for example, a high resolution spectrum obtained by Synchrotron X-ray source XRD, as illustrated in FIG. 1. For example, in the core including crystalline $LiFePO_4$, only the olivine crystalline phase may be present, and a separate secondary phase including, for example, $Fe^{3+}$ may not be formed.

In the cathode active material, an amount of a metal that has an oxidation number of +3 present in the core may be 5 weight (wt) % or less based on the total amount of a metal that has an oxidation number of +2 and the metal that has an oxidation number of +3. For example, the amount of the metal that has an oxidation number of +3 present in the core may be from about 0.1 wt % to about 5 wt % based on the total amount of the metal that has an oxidation number of +2 and the metal that has an oxidation number of +3. For example, the amount of the metal that has an oxidation number of +3 may be from about 0.1 wt % to about 2.8 wt % based on the total amount of the metal that has an oxidation number of +2 and the metal that has an oxidation number of +3. Since the metal that has an oxidation number of +3 may not be additionally oxidized into an oxidation number of +4 during charging, the metal that has an oxidation number of +3 does not engage in an electrode reaction. Accordingly, the higher the amount of the metal that has an oxidation number of +3, the lower the electrical capacity of the cathode active material. As an example, the metal that has an oxidation number of +3 may be $Fe^{+3}$, and the metal that has an oxidation number of +2 may be $Fe^{+2}$.

The cathode active material may be formed by introducing nitrogen to at least a portion of the material having an olivine structure. For example, due to the doping of a nitrogen atom into at least a portion of the material having an olivine structure, at least a portion of oxygen included in the core may be substituted with a nitrogen atom. This substitution may be performed while maintaining the olivine crystalline phase and without the formation of a separate secondary phase.

Accordingly, the nitrogen atom doping region and the nitrogen atom undoped region in the core may show up as an identical phase in transmission electron microscopy (TEM) test results.

The cathode active material may have an improved conductivity.

A reason for the improved conductivity of the cathode active material will now be described in detail. However, the following description will be presented for illustrative purposes only and is not intended to limit the scope of the embodiments. For example, the following description is not intended to limit the scope of the embodiments to any particular theory or mechanism.

For example, an oxynitride and/or nitride of the material having an olivine structure (formed by the doping of the nitrogen atom into the core of the material having an olivine structure) has high conductivity, rigidity, and high thermal stability. Accordingly, conductivity of the core including the material having an olivine structure may be improved.

Also, due to the introduction of nitrogen to the material having an olivine structure, orientation regularity of a (020) crystal surface disposed perpendicular to a diffusion pathway of Li ions in the material having an olivine structure may be improved. The improved orientation regularity of the (020) crystal surface may be confirmed by referring to an increased peak intensity of the (020) crystal surface in an XRD spectrum. That is, since orientation regularity of the crystal surface disposed perpendicular to the diffusion pathway of Li ions is improved, as compared to a crystal surface disposed parallel to the diffusion pathway of Li ions, a diffusion distance of Li ions may be reduced. Accordingly, conductivity of Li ions may be improved. When the cathode active material is used in a battery, high-rate characteristics of the battery may be improved.

In an embodiment of the cathode active material, in an X-ray photoelectron spectroscopy (XPS) spectrum of the core, a nitrogen peak appears at a binding energy of about 398 to about 400 eV and an oxygen peak appears at a binding energy of about 530 to about 534 eV. A composition ratio of nitrogen to oxygen measured from areas of the peaks may be greater than 1:100.

The nitrogen peak corresponds to a binding energy of the 1s orbital of nitrogen in an oxide, and thus indicates presence of a nitride of the material having an olivine structure and/or an oxynitride of the material having an olivine structure in the core. That is, the nitrogen peak indicates presence of nitrogen atoms within the core. The oxygen peak corresponds to a binding energy of the 1s orbital of oxygen, and indicates presence of oxygen atoms within the core.

The composition ratio of nitrogen to oxygen measured from the areas of the nitrogen peak and the oxygen peak may be greater than 1:100. Thus, an atomic ratio of nitrogen to oxygen may be greater than 1:100. In the core, at least one nitrogen atom may be present per 100 oxygen atoms. For example, regarding the cathode active material, the composition ratio of nitrogen to oxygen, as measured from the areas of the nitrogen peak and the oxygen peak, may be in a range of 1:100 to 20:100. For example, the composition ratio may be 1:70 to 5:60.

In an embodiment of the cathode active material, in the XPS spectrum of the core, the nitrogen peak appears at a binding energy of about 398 to about 400 eV and a phosphorus (P) peak appears at a binding energy of about 132 to about 136 eV. A composition ratio of nitrogen to phosphorus measured from areas of the peaks may be greater than 1:100.

The phosphorus (P) peak corresponds to a binding energy of the 2p orbital of phosphorus and indicates the presence of phosphorus atoms within the core.

The composition ratio of nitrogen to phosphorus, as measured from the areas of the nitrogen peak and the phosphorus peak, may be greater than 5:100. Thus, an atomic ratio of nitrogen to phosphorus may be greater than 5:100. In the core, 100 phosphorus atoms may be present per 5 nitrogen atoms. For example, regarding the cathode active material, the composition ratio of nitrogen to phosphorus, as measured from the areas of the peaks, may be in a range of 5:100 to 30:100. For example, the composition ratio may be in a range of 7:100 to 26:100.

In an embodiment of the cathode active material, in the XPS spectrum of the core, a nitrogen peak may also be present at a binding energy of 396 to 398 eV. The peak may correspond to a binding energy of the 1s orbital of nitrogen bound to a transition metal. The transition metal may be, for example, iron (Fe).

In the cathode active material, an average doping depth of a nitrogen atom doped into the core may be 50% or less of the average core radius. For example, the average doping depth may be 30% or less of the average core radius. For example, the average doping depth may be 15% or less of the average core radius. Within the doping depths described above, the cathode active material may have improved high-rate characteristics.

In the cathode active material, an average particle diameter of the core including the olivine-based material may be in a range of about 1 nm to about 1000 μm. For example, the average particle diameter of the core may be in a range of about 10 nm to about 500 μm. The core may be a particle-phase powder. If the average particle diameter of the core is less than 1 nm, it may be difficult to realize a sufficient capacitance. On the other hand, if the average particle diameter of the core is greater than 1000 μm, lithium ions may not diffuse.

The material having an olivine structure included in the cathode active material may be represented by Formula 1 below:

$$Li_xMe_yM_zPO_{4-d}X_d$$      Formula 1 wherein $0.9 \leq x \leq 1.1$, $0 < y \leq 1$, $0 \leq z \leq 1$, $1.9 \leq x+y+z \leq 2.1$, and $0 \leq d \leq 0.2$; Me represents at least one of iron (Fe), manganese (Mn), nickel (Ni), and cobalt (Co); M represents at least one of magnesium (Mg), calcium (Ca), strontium (Sr), barium (Ba), titanium (Ti), zirconium (Zr), niobium (Nb), molybdenum (Mo), tungsten (W), zinc (Zn), aluminum (Al), and silicon (Si); and X represents at least one of sulfur (S) and fluorine (F).

For example, the material having an olivine structure may include at least one compound selected from $LiFePO_4$, $LiFe_{1-a}Mn_aPO_4$ ($0 < a < 1$), and $LiMnPO_4$.

In the cathode active material, a coating layer including conductive carbon may be additionally formed on the surface of the core. That is, the coating layer including conductive carbon may be additionally formed on the material having an olivine structure. As an example, the carbon coating layer may be formed by dissolving a carbon precursor, such as polyethylene, polypropylene, glucose, fructose, sucrose, xylose, cellulose, etc., in water and/or an organic solvent containing the material having the olivine structure to form a mixture. The mixture may be dried and then heat treated to form a carbon coating on the surface of the core.

For example, the coating layer including the conductive carbon may be disposed on the core which has an olivine structure and in which nitrogen is doped to a predetermined depth.

A method of preparing a cathode active material according to an embodiment includes contacting the material having an olivine structure with a nitrogen precursor gas.

Contacting of the cathode active material and the nitrogen gas precursor may cause nitrogen atoms to diffuse into the material having an olivine structure. Thus, at least a portion of the core may have an oxynitride and/or nitride of the material having an olivine structure. The oxynitride and/or nitride of the material having an olivine structure may be formed in at least a portion of the material having an olivine structure.

The nitrogen precursor gas may include, e.g., ammonia gas. The nitrogen precursor gas may be any one of various nitrogen supply gases, such as, for example, urea, methyl amine, ethyl amine, etc.

In the method, the material having an olivine structure may be represented by Formula 1 below:

$$Li_xMe_yM_zPO_{4-d}X_d$$      Formula 1 wherein $0.9 \leq x \leq 1.1$, $0 < y \leq 1$, $0 \leq z \leq 1$, $1.9 \leq x+y+z \leq 2.1$, and $0 \leq d \leq 0.2$; Me represents at least one of Fe, Mn, Ni, and Co; M represents Mg, Ca, Sr, Ba, Ti, Zr, Nb, Mo, W, Zn, Al, or Si; and X represents S or F.

For example, the material having an olivine structure may include at least one compound selected from $LiFePO_4$, $LiFe_{1-a}Mn_aPO_4$ ($0 < a < 1$), and $LiMnPO_4$.

The contacting of the material having an olivine structure and the nitrogen precursor gas may be performed at a temperature of about 100 to about 800° C. The contacting temperature may be appropriately determined so as to provide a cathode active material according to embodiments. For example, the contacting temperature may be from about 200 to about 650° C. For example, the contacting temperature may be from about 200 to about 600° C.

The contacting of the material having an olivine structure and the nitrogen precursor gas may be performed for about 1 to about 600 minutes. For example, the contacting time may be from about 10 to about 300 minutes. For example, the contacting time may be from about 10 to about 100 minutes. If the contacting time is within the ranges described above, the cathode active material may enable production of a lithium battery with more enhanced high-rate characteristics.

In the method, the material having an olivine structure may further include a coating layer including conductive carbon on a surface of the material having an olivine structure. That is, before the nitrogen precursor gas contacts the material having an olivine structure, a carbonaceous coating layer may be formed on the material having an olivine structure.

Even when the carbonaceous coating layer is formed on the material having an olivine structure, the precursor gas may permeate into the carbonaceous coating layer and may diffuse into the inside of the material having an olivine structure, thereby doping nitrogen atoms inside the material having an olivine structure.

A cathode according to an embodiment includes the cathode active material. The cathode may be formed by, for example, forming a cathode active material composition including the cathode active material and a binder into a given shape, or by coating the cathode active material composition on a current collector such as a copper foil or an aluminum foil.

In detail, a cathode active material, a conductive agent, a binder, and a solvent may be mixed to prepare a cathode active material composition. The cathode active material composition may be directly coated onto a metal current collector to form a cathode plate. In another embodiment, the cathode active material composition may be cast onto a separate support and separated from the support as a film and then the film may be laminated onto a metal current collector to form the cathode plate.

The conductive agent may be carbon black or graphite particles, but is not limited thereto. For example, the conductive agent may be any one of various conductive agents used in the art. Examples of the conductive agent include graphite, such as artificial graphite or natural graphite; carbon black, such as acetylene black, Ketjen black, channel black, furnace black, lamp black, or thermal black; a conductive fiber, such as carbon fiber or metallic fiber; carbon powder or metallic powder, such as fluorocarbon powder, aluminum powder, or nickel powder; a conductive whisker, such as zinc oxide or potassium titanate; a conductive metal oxide, such as titanium oxide; and polyphenylene derivatives.

The binder may be a vinylidene fluoride/hexafluoropropylene copolymer; polyvinylidenefluoride (PVDF), polyacrylonitrile, polymethylmethacrylate, polytetrafluoroethylene, or a mixture thereof; or a styrene butadiene rubber-based polymer. For example, the binder may be any one of various binders used in the art.

The solvent may be N-methylpyrrolidone, acetone, or water. For example, the solvent may be any one of various solvents used in the art.

Amounts of the cathode active material, the conductive agent, the binder, and the solvent used herein may be used at levels suitable for a lithium battery. According to a purpose and structure of the lithium battery, one or more of the conductive agent, the binder, and the solvent may be omitted.

A lithium battery according to an embodiment includes the cathode including the cathode active material. The lithium battery may be manufactured as follows.

First, the cathode is manufactured according to the method described above.

Then, an anode active material, a conductive agent, a binder, and a solvent are mixed to prepare an anode active material composition. The anode active material composition may be directly coated onto a metal current collector and dried to prepare an anode plate. Alternatively, the anode active material composition may be cast onto a separate support and separated from the support as a film, and then the film may be laminated onto a metal current collector to form the anode plate.

The anode active material may be any one of various materials that are generally used as an anode active material in the art. Detailed examples of the anode active material are lithium metal, a metal that is alloyable with lithium, a transition metal oxide, a transition metal sulfide, a material that is used to dope or undope lithium, a material that enables reversible intercalation and deintercalation of lithium ions, a conductive polymer, etc.

Examples of the transition metal oxide include a tungsten oxide, a molybdenum oxide, a titanium oxide, a lithium titanium oxide, a vanadium oxide, and a lithium vanadium oxide. Detailed examples of the transition metal oxide are a Group I metallic compound, such as CuO, $Cu_2O$, $Ag_2O$, CuS, or $CuSO_4$; a Group IV metallic compound, such as $TiS_2$, or SnO; a Group V metallic compound, such as $V_2O_5$, $V_6O_{12}$, $VO_x$ ($0<x<6$), $Nb_2O_5$, $Bi_2O_3$, or $Sb_2O_3$; a Group VI metallic compound, such as $CrO_3$, $Cr_2O_3$, $MoO_3$, $MoS_2$, $WO_3$, or $SeO_2$; a Group VII metallic compound, such as $MnO_2$ or $Mn_2O_3$; a Group VIII metallic compound, such as $Fe_2O_3$, FeO, $Fe_3O_4$, $Ni_2O_3$, NiO, $CoO_3$, or CoO; and a compound represented by $Li_xMN_yX_2$ (M and N are each a Group I to VIII metal, X is oxygen or sulfur, $0.1 \leq x \leq 2$, $0 \leq y \leq 1$), for example, lithium titanate, such as, $Li_yTiO_2$ ($0 \leq y \leq 1$), $Li_{4+y}Ti_5O_{12}$ ($0 \leq y \leq 1$), or $Li_{4+y}Ti_{11}O_{20}$ ($0 \leq y \leq 1$).

Examples of the material that is used to dope or undope lithium include silicon (Si), $SiO_x$ ($0<x<2$), a Si—Y alloy (Y may be an alkali metal, an alkali earth metal, a Group 13 element, a Group 14 element, a transition metal, a rare-earth element, or a combination thereof, and may not be Si), Sn, $SnO_2$, and Sn—Y (Y may be an alkali metal, an alkali earth metal, a Group 13 element, a Group 14 element, a transition metal, a rare-earth element, or a combination thereof, and may not be Si), and at least one of these may be used in combination with $SiO_2$ for use as the negative active material. The element Y may be magnesium (Mg), calcium (Ca), strontium (Sr), barium (Ba), radium (Ra), scandium (Sc), yttrium (Y), titanium (Ti), zirconium (Zr), hafnium (Hf), rutherfordium (Rf), vanadium (V), niobium (Nb), tantalum (Ta), dubnium (Db), chromium (Cr), molybdenum (Mo), tungsten (W), seaborgium (Sg), technetium (Tc), rhenium (Re), bohrium (Bh), iron (Fe), lead (Pb), ruthenium (Ru), osmium (Os), hassium (Hs), rhodium (Rh), iridium (Ir), palladium (Pd), platinum (Pt), copper (Cu), silver (Ag), gold (Au), zinc (Zn), cadmium (Cd), boron (B), aluminum (Al), gallium (Ga), tin (Sn), indium (In), titanium (Ti), germanium (Ge), phosphorus (P), arsenic (As), antimony (Sb), bismuth (Bi), sulfur (S), selenium (Se), tellurium (Te), polonium (Po), or a combination thereof.

The material that enables reversible intercalation and deintercalation of lithium ions may be any one of various carbonaceous negative active materials that are may be suitable for a lithium battery. Examples of the material that enables reversible intercalation and deintercalation of lithium ions are crystalline carbon, amorphous carbon, and a mixture thereof. Examples of crystalline carbon are amorphous, plate, flake, spherical, or fiber-type natural graphite; and artificial graphite, and examples of amorphous carbon are soft carbon (low-temperature calcined carbon), hard carbon, mesophase pitch carbide, and calcined coke.

Examples of the conductive polymer include disulfide, polypyrrole, polyaniline, polyparaphenylene, polyacetylene, a polyacene-based material, etc.

The conductive agent, the binder, and the solvent used in the anode active material composition may be the same as used in the cathode active material composition. Each of the cathode active material composition and the anode active material composition may further include a plasticizer to form pores in the cathode or anode plate.

Amounts of the anode active material, the conductive agent, the binder, and the solvent used herein may be used at levels suitable for a lithium battery. According to a purpose and structure of the lithium battery, one or more of the conductive agent, the binder, and the solvent may be omitted.

A separator that is to be interposed between the cathode and the anode is prepared. The separator may be any one of various separators typically used in a lithium battery. The separator may have a low resistance to ion flow and a high electrolytic solution-retaining capability. Examples of the separator are glass fiber, polyester, TEFLON, polyethylene, polypropylene, polytetrafluoroethylene (PTFE), and a combination thereof. These separators may be in a non-woven or woven fabric form. For example, a separator suitable for a lithium ion battery may be a rollable separator formed of, for example, polyethylene or polypropylene. A separator suitable for a lithium ion polymer battery may be a separator that has an excellent organic electrolytic solution-retaining capability. An example of a method of forming the separator will now be described in detail.

A polymer resin, a filler, and a solvent may be mixed to prepare a separator composition. The separator composition may be directly coated onto an electrode and dried to form a separator. Alternatively, the separator composition may be cast onto a support, dried, and then separated from the support as a separator film. Then, the separator film may be laminated onto an electrode, thereby forming a separator.

The polymer resin used in forming the separator may be any one of various materials that are used as a binder of an electrode plate. Examples of the polymer include a vinylidenefluoride/hexafluoropropylene copolymer, polyvinylidenefluoride (PVDF), polyacrylonitrile, polymethylmethacrylate, and a mixture thereof.

An electrolyte may be prepared. An organic electrolytic solution may be used as the electrolyte. The organic electrolytic solution may be prepared by dissolving a lithium salt in an organic solvent.

The organic solvent may be any one of various organic solvents used in the art. Examples of the organic solvent are propylenecarbonate, ethylenecarbonate, fluoroethylenecarbonate, butylenecarbonate, dimethylcarbonate, diethylcarbonate, methylethylcarbonate, methylpropylcarbonate, ethylpropylcarbonate, methylisopropylcarbonate, dipropylcarbonate, dibutylcarbonate, benzonitrile, acetonitrile, tetrahydrofuran, 2-methyltetrahydrofuran, γ-butyrolactone, dioxolane, 4-methyldioxolane, N,N-dimethylformamide, dimethylacetamide, dimethylsulfoxide, dioxane, 1,2-dimethoxyethane, sulfolane, dichloroethane, chlorobenzene, nitrobenzene, diethyleneglycol, dimethylether, and a mixture thereof.

The lithium salt may be any one of various lithium salts used in the art. Examples of the lithium salt include $LiPF_6$, $LiBF_4$, $LiSbF_6$, $LiAsF_6$, $LiClO_4$, $LiCF_3SO_3$, $Li(CF_3SO_2)_2N$, $LiC_4F_9SO_3$, $LiAlO_2$, $LiAlCl_4$, $LiN(C_xF_{2x+1}SO_2)(C_yF_{2y+1}SO_2)$ (each of x and y is a natural number), LiCl, LiI, and a mixture thereof.

Also, the electrolyte may be a solid electrolyte, such as an organic solid electrolyte or an inorganic solid electrolyte. When the solid electrolyte is used, the solid electrolyte may also function as a separation film.

Examples of an organic solid electrolyte include a polyethylene derivative, a polyethylene oxide derivative, a polypropylene oxide derivative, an ester phosphate polymer, a polylysine alginate, polyester sulfide, polyvinyl alcohol, polyvinylidene sulfide, a polymer including an ionic dissociation group, etc.

Examples of an inorganic solid electrolyte are oxide borate, lithium oxynitride, etc. For example, any one of various materials that are available for use as a solid electrolyte in the art may be used herein. The solid electrolyte may be formed on an anode by, for example, sputtering. For example, a nitride, halide, sulfate of Li, such as $Li_3N$, LiI, $Li_5NI_2$, $Li_3N$—LiI—LiOH, $LiSiO_4$, $LiSiO_4$—LiI—LiOH, $Li_2SiS_3$, $Li_4SiO_4$, $Li_4SiO_4$—LiI—LiOH, or $Li_3PO_4$—$Li_2S$—$SiS_2$, etc may be used.

Figure 7:
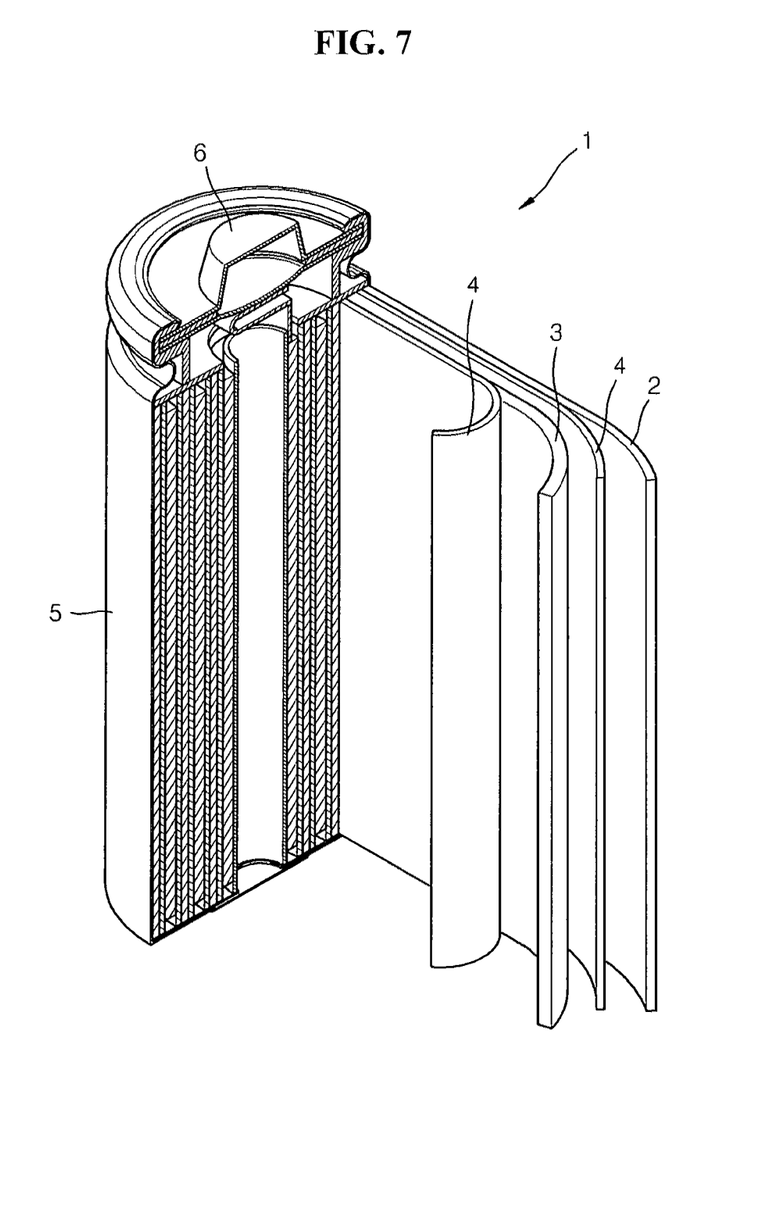
FIG. 7 illustrates a schematic view of a lithium battery according to an embodiment.

Referring to FIG. 7, a lithium battery 1 may include a cathode 3, an anode 2, and a separator 4. The cathode 3, the anode 2, and the separator 4 may be wound or folded to be housed in a battery case 5. Then, an organic electrolytic solution may be injected to the battery case 5 and the resultant structure may be sealed with a cap assembly 6, thereby completely manufacturing the lithium battery 1. The battery case 5 may have, for example, a cylindrical, rectangular, or thin-film form. For example, the lithium battery 1 may be a thin-film type battery. In an embodiment, the lithium battery 1 may be a lithium ion battery.

A battery assembly may be formed by interposing the separator between the cathode and the anode. A plurality of the battery assemblies may be stacked in a bi-cell structure, and then impregnated with an organic electrolytic solution. The resultant structure may be housed in a pouch and sealed, thereby completing manufacturing of a lithium ion polymer battery.

In addition, the battery assemblies may be stacked on each other to form a battery pack connected in series. The battery pack may be used in high-capacitance and high-performance devices, such as a notebook, a smart phone, an electric tool, an electric vehicle (EV), etc.

Since the lithium battery has good high-temperature cyclic characteristics and high-temperature stability, the lithium battery is suitable for use in middle and large-sized energy storage devices, such as for an EV. The lithium battery may be suitable for use in a hybrid electric vehicle such as a plug-in hybrid electric vehicle (PHEV).

One or more embodiments will now be described in further detail with reference to the following Examples and Comparative Examples in order to set forth particular details of one or more embodiments. However, it is to be understood that the embodiments are not limited to the particular details described. Further, the Comparative Examples are set forth to highlight certain characteristics of certain embodiments, and are not to be construed as either limiting the scope of the invention as exemplified in the Examples or as necessarily being outside the scope of the invention in every respect Preparation of Cathode Active Material Example 1

At room temperature, 300 mg of $LiFePO_4$ (Phostech Lithium Inc.) having an average particle diameter of 200 nm and having a carbonaceous coating formed on its surface was loaded into a silica tube furnace and the furnace was depressurized into a vacuum state. Then, the furnace was heated from room temperature to 300° C. for 10 minutes under vacuum conditions. While the temperature and pressure inside the furnace were maintained at 300° C. and 760 Torr, nitrogen doping was performed thereon for a total of 30 minutes by supplying an ammonia gas (99.98%) into the furnace at a flow rate of 500 sccm (standard cubic centimeters per minute) for 10 minutes and then 100 sccm for 20 minutes. After the reaction was finished, the supply of the ammonia gas was stopped and the furnace was depressurized into a vacuum state and the temperature was decreased to room temperature.

Example 2

A cathode active material was prepared in the same manner as in Example 1, except that the temperature inside the furnace was heated to and maintained at 400° C.

Example 3

A cathode active material was prepared in the same manner as in Example 1, except that the temperature inside the furnace was heated to and maintained at 500° C.

Example 4

A cathode active material was prepared in the same manner as in Example 1, except that the temperature inside the furnace was heated to and maintained at 600° C.

Comparative Example 1

LiFePO$_4$ (Phostech Lithium Inc.) having an average particle size of 200 nm used in Example 1 was used as a cathode active material without the nitrogen doping.

Preparation of Cathode and Lithium Battery

Example 5

The cathode active material prepared in Example 1 and a carbon conductive agent (Super P) were uniformly mixed in a weight ratio of 82:10 and then a polyvinylidene fluoride (PVDF) binder solution was added thereto, thereby preparing a slurry including the cathode active material, the carbon conductive agent, and the binder in a weight ratio of 82:10:8. The slurry was applied onto an aluminum current collector by using a doctor blade while an interval between the slurry and the aluminum current collector was maintained at 100 μm. The applied slurry was dried at a temperature of 120° C., thereby completing manufacturing of a cathode plate.

A 2032-standard coin cell was manufactured using the cathode plate, an opposite electrode formed of lithium metal, a PE separator, and a solution in which 1.3M LiPF$_6$ was dissolved in a mixed solvent including ethylene carbonate (EC) and diethylene carbonate (DEC) in a volumetric ratio of 3:7 as an electrolyte.

Example 6

A 2032-standard coin cell was manufactured in the same manner as in Example 5, except that the cathode active material prepared according to Example 2 was used instead of the cathode active material prepared according to Example 1.

Example 7

A 2032-standard coin cell was manufactured in the same manner as in Example 5, except that the cathode active material prepared according to Example 3 was used instead of the cathode active material prepared according to Example 1.

Example 8

A 2032-standard coin cell was manufactured in the same manner as in Example 5, except that the cathode active material prepared according to Example 4 was used instead of the cathode active material prepared according to Example 1.

Comparative Example 2

A 2032-standard coin cell was manufactured in the same manner as in Example 5, except that the cathode active material prepared according to Comparative Example 1 was used instead of the cathode active material prepared according to Example 1.

Evaluation Example 1

XRD Test

An X-ray diffraction (XRD) test was performed on the cathode active material powders prepared according to Examples 1 to 4 and Comparative Example 1. Results thereof are shown in FIG. 1. XRD was measured using a Synchrotron high resolution X-ray source at Pohang Accelerator Laboratory As shown in FIG. 1, a new secondary phase was not present although the nitrogen doping was performed.

Evaluation Example 2

XPS Test

Figure 2:
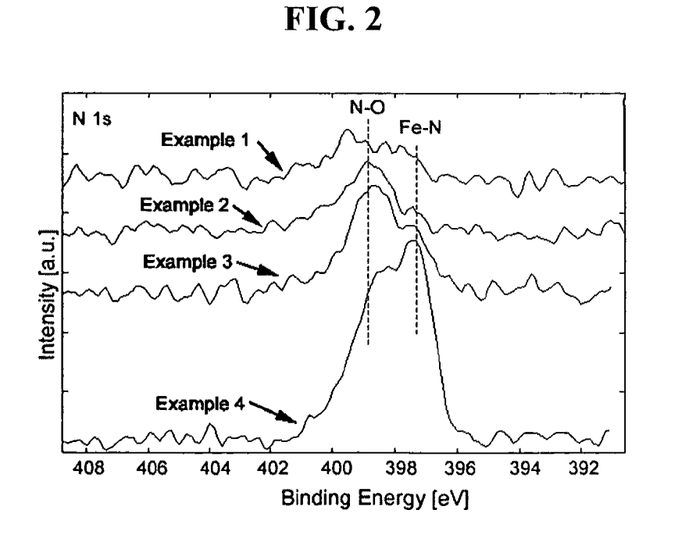
FIG. 2 illustrates X-ray photoelectron spectroscopy (XPS) test results of cathode active materials prepared according to Examples 1 through 4.

An X-ray photoelectron spectroscopy (XPS) test was performed on the cathode active materials prepared according to Examples 1 through 4 and Comparative Example 1). Some of the results are shown in FIG. 2. An XPS device (model name: Q2000, PHI Inc) was used in the experiment with an X-ray source (mono Al k-α 1486.6 eV).

Referring to FIG. 2, the cathode active materials prepared according to Examples 1 through 4 showed a peak corresponding to a binding energy of the 1s orbital of nitrogen in the vicinity of 399 eV. The cathode active materials prepared according to Examples 3 and 4 showed peaks corresponding to a binding energy of the 1s orbital of nitrogen bound to Fe at about 396.4 eV. Thus, presence of nitrogen doped into the olivine core was confirmed.

In addition, a relative composition ratio of elements measured based on areas of peaks corresponding to the respectively elements in the XPS test is shown in Table 1 below.

TABLE 1

| | N (1s) ~399 eV | N (1s) 396.4 eV | O (1s) 530~534 eV | P (2p) 530~534 eV | Fe (2p3) 705~720 eV |
|---|---|---|---|---|---|
| Example 1 | 1.43 | — | 69.69 | 16.46 | 12.68 |
| Example 2 | 2.44 | — | 69.66 | 16.75 | 11.30 |
| Example 3 | 3.27 | 1.57 | 66.67 | 16.43 | 12.06 |
| Example 4 | 4.34 | 5.21 | 61.62 | 16.99 | 11.84 |
| Comparative Example 1 | — | — | 70.11 | 17.32 | 12.56 |

As shown in Table 1, a composition ratio of nitrogen to oxygen present at the surfaces of the core measured based on areas of the nitrogen peak in the vicinity of 399 eV and an oxygen peak in the vicinity of 530 to 534 eV was in a range of 1:70 to 5:60. In addition, a composition ratio of nitrogen to phosphorus (P) measured based on areas of the nitrogen peak in the vicinity of 399 eV and a phosphorus (P) peak in the vicinity of 530 to 534 eV was in a range of 7:100 to 26:100. The cathode active material of Comparative Example 1 did not have a nitrogen peak.

Accordingly, it was confirmed that the core of the cathode active material did not have a separate secondary phase, that is, the core included a single phase olivine.

Evaluation Example 3

Mossbauer Test

Figure 3A:
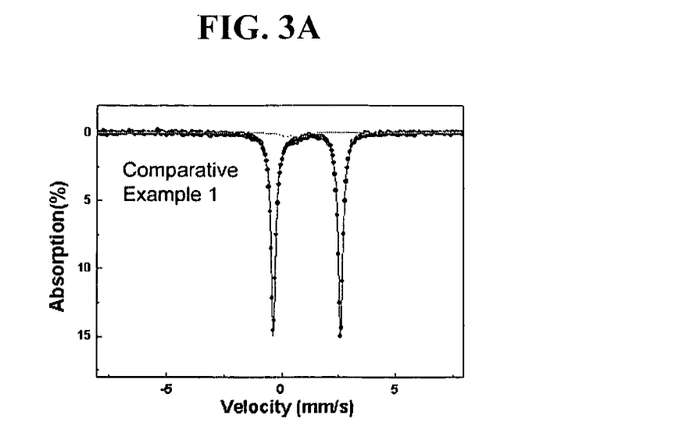
FIG. 3A illustrates Mossbauer spectroscopy test results of a cathode active material prepared according to Comparative Example 1.
Figure 3B:
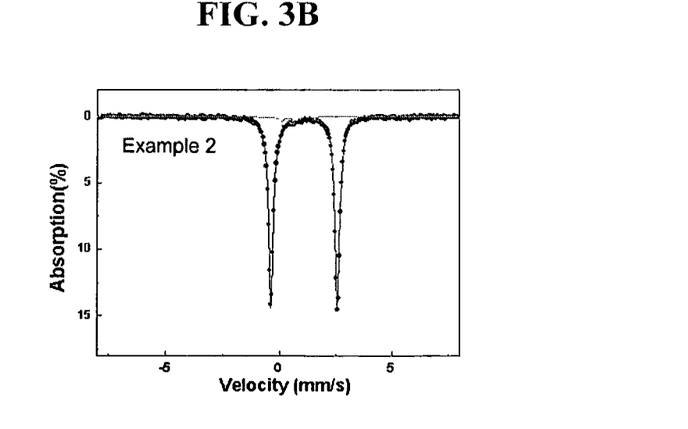
FIG. 3B illustrates Mossbauer spectroscopy test results of a cathode active material prepared according to Example 2.
Figure 3C:
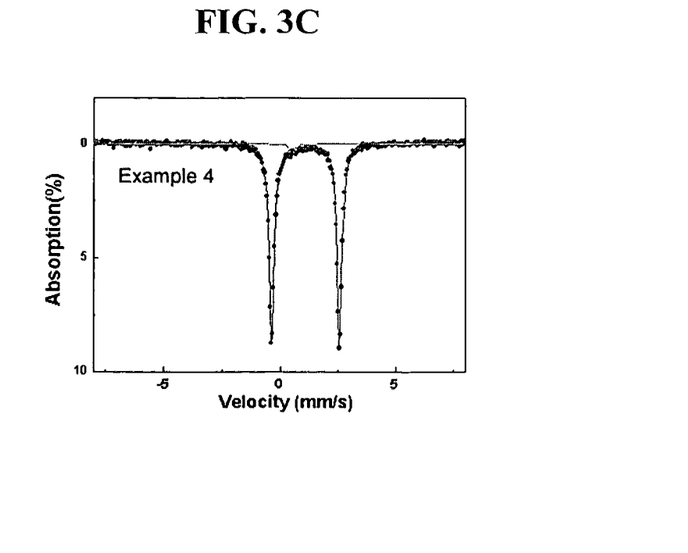
FIG. 3C illustrates Mossbauer spectroscopy test results of a cathode active material prepared according to Example 4.

A Mossbauer spectroscopy tests was performed at room temperature on the cathode active materials prepared according to Examples 1 to 4 and Comparative Example 1, and some of results thereof are shown in FIGS. 3A to 3C and Table 2 below. To perform Mossbauer spectroscopy, a $^{57}Co$ source included in an Rh matrix was used. Measurement values were calibrated by using a standard α-Fe foil as a reference, and the results are shown in FIGS. 3A to 3C.

In FIGS. 3A to 3C, two sharp peaks correspond to $Fe^{2+}$, and a weak peak near Absorption of 0% corresponds to $Fe^{3+}$.

TABLE 2

| | Oxidation Number | IS[mm/s] | QS[mm/s] | Γ(full width at half maximum) | wt % |
| --- | --- | --- | --- | --- | --- |
| Comparative Example 1 | $Fe^{2+}$ | 1.108 | 2.954 | 0.251 | 97.11 |
| | $Fe^{3+}$ | 0.382 | 0.506 | 0.377 | 2.89 |
| Example 2 | $Fe^{2+}$ | 1.108 | 2.954 | 0.249 | 97.74 |
| | $Fe^{3+}$ | 0.370 | 0.590 | 0.278 | 2.26 |
| Example 4 | $Fe^{2+}$ | 1.108 | 2.951 | 0.252 | 97.73 |
| | $Fe^{3+}$ | 0.544 | 0.237 | 0.200 | 2.27 |

As shown in Table 2, in the cathode active materials prepared according to Examples 2 and 4 and Comparative Example 1, an amount of $Fe^{3+}$ was less than 5 wt %, and an amount of $Fe^{3+}$ of Examples 2 and 4 was lower than that of Comparative Example 1. The full width at half maximum (FWHM) refers to a value at FWHM with respect to peaks in FIGS. 3A to 3C.

Evaluation Example 4

TEM Examination

Figure 4A:
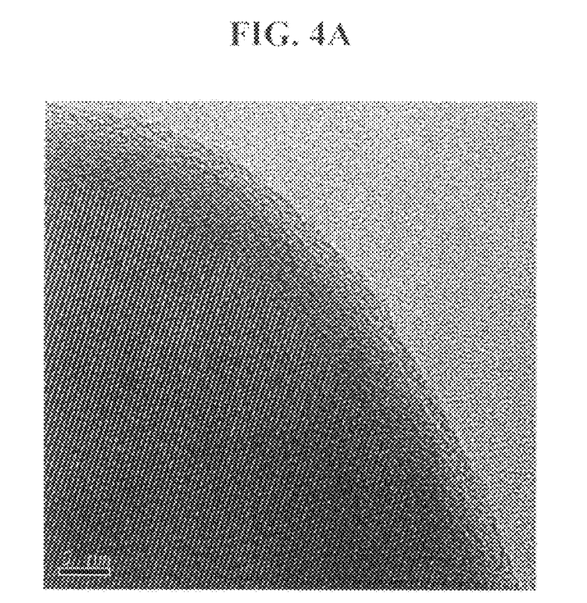
FIG. 4A illustrates transmission electron microscope (TEM) test results of a cathode active material prepared according to Comparative Example 2.
Figure 4B:
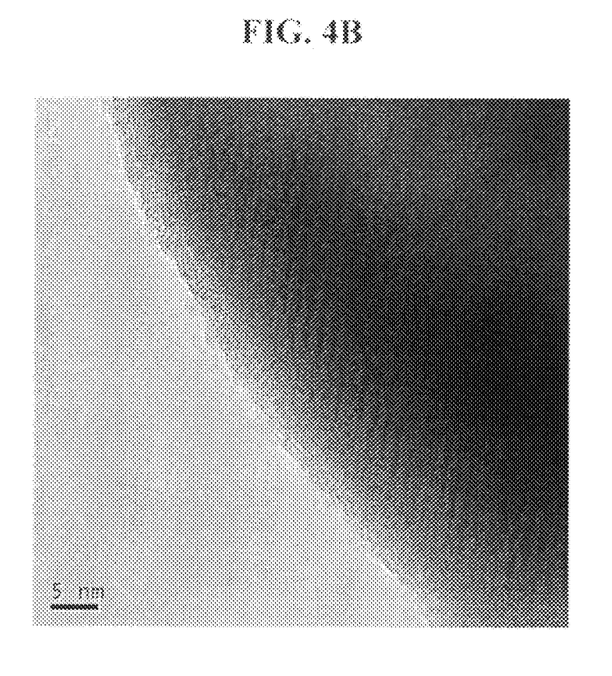
FIG. 4B illustrates TEM test results of a cathode active material prepared according to Example 1.
Figure 4C:
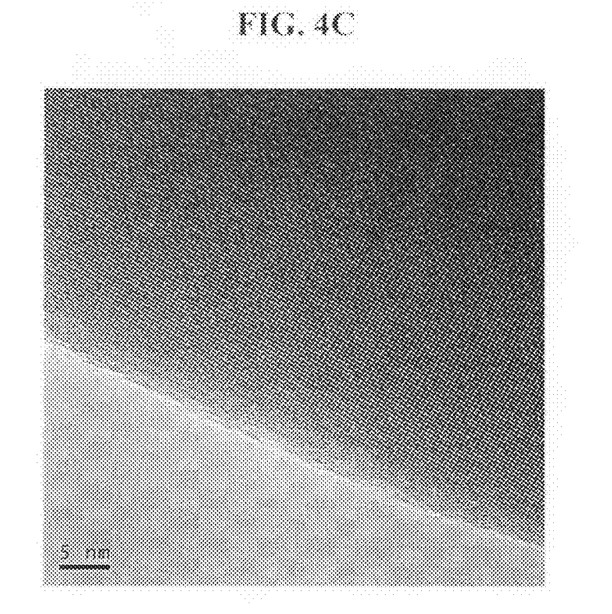
FIG. 4C illustrates TEM test results of a cathode active material prepared according to Example 4.

The cathode active materials prepared according to Examples 1 to 4 and Comparative Example 1 were examined by TEM (transmission electron microscopy), and some of results thereof are shown in FIGS. 4A to 4C.

Referring to FIGS. 4A to 4C, the $LiFePO_4$ core included in the cathode active material prepared according to Comparative Example 1 (4A) showed the same crystalline phase as the $LiFePO_4$ cores prepared according to Examples 1 (4B) and 4 (4C). That is, despite the nitrogen doping performed in Examples 1 and 4, the crystalline phase of $LiFePO_4$ core was not changed and a separate amorphous phase was not formed. In FIGS. 4A, 4B, and 4C, an amorphous phase formed on the $LiFePO_4$ core was a carbonaceous coating layer.

Evaluation Example 5

High-Rate Charge and Discharge Test

Figure 5:
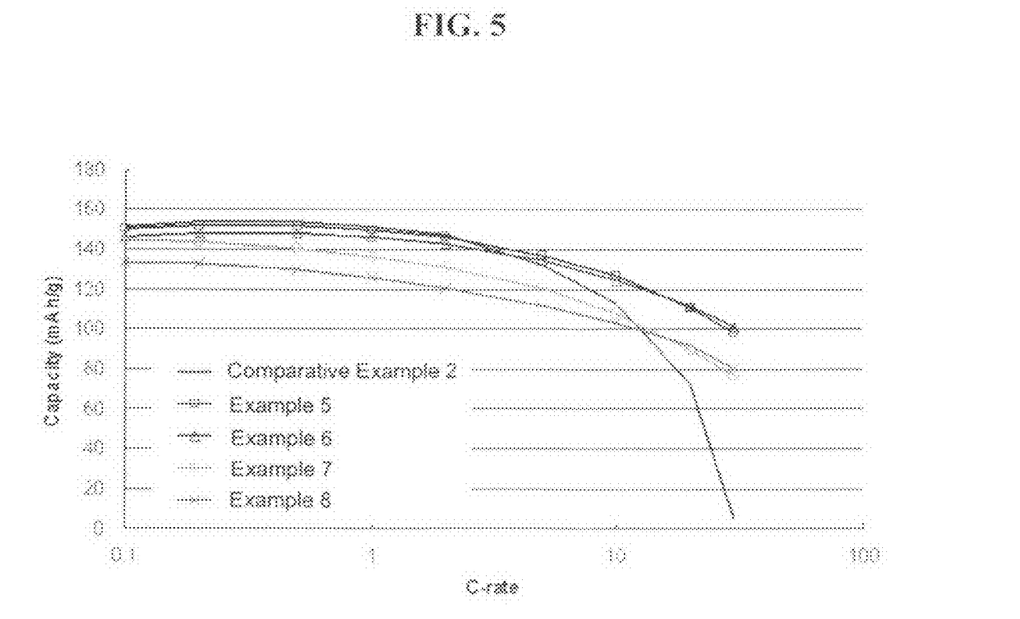
FIG. 5 illustrates high-rate discharge test results of lithium batteries manufactured according to Examples 5 through 8 and Comparative Example 2.

The coin cells manufactured according to Examples 5 through 8 and Comparative Example 2 were charged with a constant current of 0.1 C rate in a voltage range of about 2.5 to about 4.1 V with respect to lithium metal at room temperature. In this regard, discharge capacitances during discharging with respect to current densities are shown in FIG. 5. Current densities during discharging were 0.1 C, 0.2 C, 0.5 C, 1 C, 2 C, 5 C, 10 C, 20 C, and 30 C rate.

Referring to FIG. 5, the coin cells of Examples 5 through 8 showed better high-rate characteristics than the coin cell of Comparative Example 2.

Evaluation Example 6

Lifetime Characteristic Test

The coin cells manufactured according to Examples 5 through 8 and Comparative Example 2 were charged and discharged in a voltage range of about 2.5 to about 4.1 V with respect to lithium metal at room temperature. In this regard, during $1^{st}$ to $50^{th}$ cycles, the coin cells were charged and discharged at a constant current of 1 C rate, and during $51^{st}$ to $100^{th}$ cycles, the coin cells were charged and discharged at a constant current of 10 C rate. Discharge capacitances were measured and the results are shown in FIG. 6.

Figure 6:
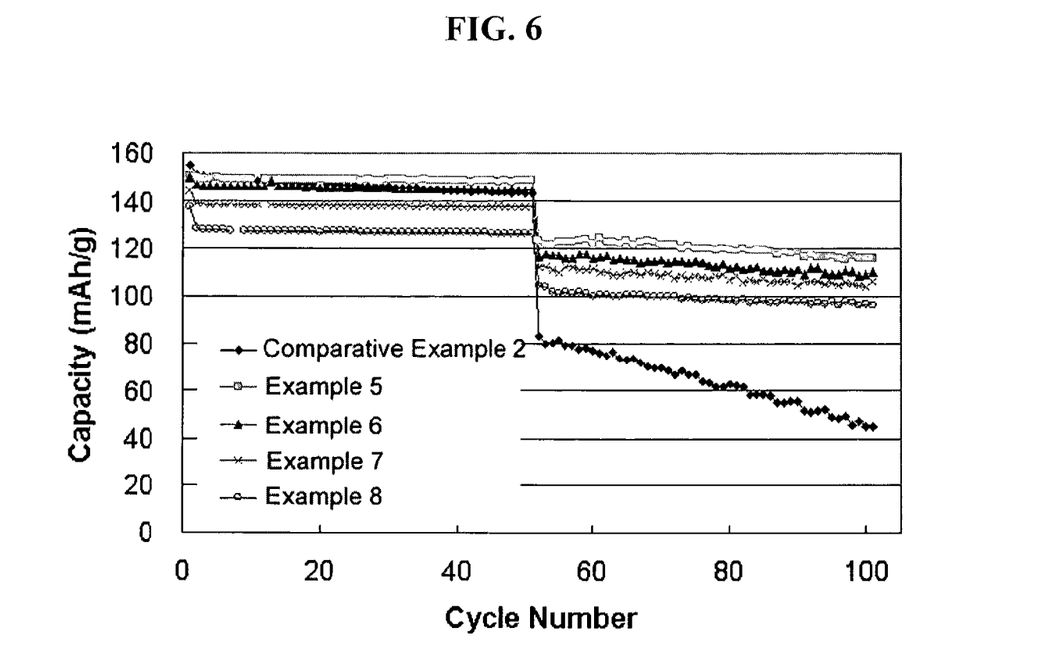
FIG. 6 illustrates lifetime characteristics test results of lithium batteries manufactured according to Examples 5 through 8 and Comparative Example 2.

Referring to FIG. 6, at high rate, the coin cells of Examples 5 through 8 showed better lifetime characteristics than the coin cell of Comparative Example 2.

By way of summation and review, an olivine-based cathode active material having an olivine structure and including a phosphorus oxide may have a higher high-temperature stability than $LiCoO_2$.

Among olivine-based cathode active materials, $LiFePO_4$ has good structural stability due to lack of a structural change during charging and discharging. Also, the material does not cause a side reaction, such as generation of oxygen, and is inexpensive. However, $LiFePO_4$ has low electrical conductivity and a low energy density.

An olivine-based cathode active material has been obtained by forming an amorphous coating layer on a core by non-stoichiometrically selecting a precursor. However, such a cathode active material may have reduced capacity due to the presence of the amorphous coating layer. Also, a complicated preparation process including at least three processes such as calcination, milling, and calcination has been required to produce such a cathode active material.

The embodiments described herein advance the art by providing a cathode active material having an olivine structure core comprising a nitrogen atom doped into the core. In particular, a lithium battery using the cathode active material may have enhanced high-rate characteristics without a decrease in capacity.

Example embodiments have been disclosed herein, and although specific terms are employed, they are used and are to be interpreted in a generic and descriptive sense only and not for purpose of limitation. Accordingly, it will be understood by those of skill in the art that various changes in form and details may be made without departing from the spirit and scope thereof as set forth in the following claims.

What is claimed is:

1. A cathode active material comprising: a core including a material having an olivine structure; and a nitrogen atom doped into at least a portion of the core, wherein a concentration of the nitrogen is graded such that the concentration continuously decreases in a direction from a surface of the core to a center of the core, and wherein: the core includes nitrogen, oxygen, and phosphorus, the core having a 1s orbital of nitrogen N(1s) peak corresponding to a binding energy of about 398 to about 400 eV and a 1s orbital oxygen O(1s) peak, and a 2p orbital phosphorus P(2p) peak corresponding to a binding energy of about 530 to about 534 eV in an X-ray photoelectron spectrum, and a composition ratio of nitrogen to oxygen in a range of 1:100 to 2.44:69.66, and nitrogen to phosphorus in a range of 7:100 to 26:100 as measured based on areas of the respective peaks is in a range of 1:100 to 2.44:69.66, and wherein the nitrogen atom is doped into the core by contacting the core and a nitrogen precursor gas at a temperature of about 300 to about 400° C.

2. The cathode active material according to claim 1, wherein a nitrogen atom-doping region of the core has a crystalline phase.

3. The cathode active material according to claim 1, wherein:
the core includes a metal having an oxidation number of +2, and
an amount of a metal having an oxidation number of +3 present in the core is 5 wt % or less based on a total amount of the metal having an oxidation number of +2 and the metal having an oxidation number of +3 present in the core.

4. The cathode active material according to claim 1, wherein an average particle diameter of the core is in a range of about 1 nm to about 1000 μm.

5. The cathode active material according to claim 1, wherein the material having an olivine structure is represented by Formula I below:

<Formula 1> wherein $0.9 \leq x \leq 1.1$, $0 \leq y \leq 1$, $0 \leq z \leq 1$, $1.9 \leq x+y+z \leq 2.1$, and $0 \leq d \leq 0.2$;

Me represents at least one of iron (Fe), manganese (Mn), nickel (Ni), and cobalt (Co);

M represents at least one of magnesium (Mg), calcium (Ca), strontium (Sr), barium (Ba), titanium (Ti), zirconium (Zr), niobium (Nb), molybdenum (Mo), tungsten (W), zinc (Zn), aluminum (Al), and silicon (Si); and X represents at least one of sulfur (S) and fluorine (F).

6. The cathode active material according to claim 1, wherein the material having an olivine structure includes at least one compound selected from $LiFePO_4$, $LiFe_{1-a}Mn_aPO_4$, where $0<a<1$, and $LiMnPO_4$.

7. The cathode active material according to claim 1, further comprising a coating layer including conductive carbon formed on the core.

8. The method of preparing a cathode active material according to claim 1, the method comprising: doping at least a portion of a core including a material having an olivine structure with a nitrogen atom, said doping comprising contacting the core and a nitrogen precursor gas, wherein a concentration of the nitrogen is graded such that the concentration decreases in a direction from a surface of the core to a center of the core.

9. The method according to claim 8, wherein the nitrogen precursor gas includes ammonia.

10. The method according to claim 8, wherein the contacting is continuously performed for about 1 minute to about 600 minutes.

11. The method according to claim 8, wherein the material having an olivine structure includes a coating layer including conductive carbon formed on the material having an olivine structure.

12. A cathode comprising the cathode active material according to claim 1.

13. A lithium battery comprising the cathode according to claim 12.

* * * * *